United States Patent
Valli

(10) Patent No.: US 12,296,448 B2
(45) Date of Patent: *May 13, 2025

(54) SYSTEM FOR FIXING PUSH RODS TO A CHAIN

(71) Applicant: REEPACK S.R.L., Seriate (IT)

(72) Inventor: Livio Valli, Bergamo (IT)

(73) Assignee: REEPACK S.R.L., Seriate (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,760

(22) Filed: Feb. 9, 2024

(65) Prior Publication Data

US 2024/0253195 A1   Aug. 1, 2024

Related U.S. Application Data

(63) Continuation of application No. 17/004,524, filed on Aug. 27, 2020, now Pat. No. 11,897,100.

(30) Foreign Application Priority Data

Sep. 3, 2019   (IT) .................. 102019000015518

(51) Int. Cl.
| | |
|---|---|
| *B25B 27/22* | (2006.01) |
| *B25B 27/00* | (2006.01) |
| *B65G 19/02* | (2006.01) |
| *B65G 19/24* | (2006.01) |

(52) U.S. Cl.
CPC .............. *B25B 27/22* (2013.01); *B65G 19/02* (2013.01); *B65G 19/24* (2013.01); *B25B 27/0071* (2013.01); *B65G 2207/12* (2013.01)

(58) Field of Classification Search
CPC ...................................... B25B 27/22
See application file for complete search history.

(56) References Cited

U.S. PATENT DOCUMENTS

| | | | | |
|---|---|---|---|---|
| 1,405,419 | A * | 2/1922 | Joy ................. | B65G 19/10 198/731 |
| 2,631,716 | A * | 3/1953 | Kottmann ........... | B65B 35/24 198/728 |
| 3,791,511 | A | 2/1974 | Holland | |
| 3,961,702 | A | 6/1976 | Blok | |
| 6,571,936 | B1 * | 6/2003 | Melhuish ........... | B65G 19/20 198/733 |

(Continued)

FOREIGN PATENT DOCUMENTS

| | | |
|---|---|---|
| EP | 2394935 | 5/2011 |
| JP | S5119692 | 2/1976 |
| JP | 2001002220 | 1/2001 |

*Primary Examiner* — William R Harp
(74) *Attorney, Agent, or Firm* — THOMPSON HINE LLP

(57) ABSTRACT

A system for moving discrete articles comprising a system for fixing push rods to the chain comprising: two opposite sides (20) that support a conveyor plane (21); two chain holder guides (22), opposite and fixed to said sides (20); two chains (23) with links with protruding pins (24) sliding inside said two chain holder guides (22); push rods (25) fixed in a removable manner, transversally to said conveyor plane (21), to said pins (24) of said chain (23); characterized in that it comprises: blocks (30) having a central hole (31) designed to slide with friction over said push rods (25); said blocks (30) having a pair of holes (32), lateral to said central hole (31), designed to slide with friction over said pins (24).

9 Claims, 5 Drawing Sheets

(56) References Cited

U.S. PATENT DOCUMENTS

| | | |
|---|---|---|
| 7,802,675 B2 | 9/2010 | Hall |
| 11,897,100 B2 * | 2/2024 | Valli ................... B65G 19/24 |
| 2023/0052922 A1 * | 2/2023 | Thibault ............... B65G 19/24 |

* cited by examiner

SYSTEM FOR FIXING PUSH RODS TO A CHAIN

This application is a U.S. Continuation of U.S. patent application Ser. No. 17/004,524, filed Aug. 27, 2020 (issued Feb. 13, 2024, U.S. Pat. No. 11,897,100), incorporated herein by reference and which claims priority to Italian Application No. 102019000015518, filed on Sep. 3, 2019.

TECHNICAL FIELD

The present invention relates to a handling system for discrete articles, for example usable for feeding containers or trays to a packaging or closing unit, in particular for foodstuff products. More particularly, the present invention relates to a system for fixing push rods to a chain with links with protruding pins.

BACKGROUND

Various systems for moving containers or trays are known.

Solutions are provided based on chains with integrated so-called porters, of different shapes and heights, based on the product to be transported/pushed, or based on chains with links with protruding pins (single or double placed at a certain fixed multiple distance, called pitch) arranged for the fixing of push rods thereto.

In this second case, the rod is mechanically constrained to the pins protruding from the links by means of fixing devices which prove to be functional but not very flexible in case they need to be removed or replaced.

In particular, a conveyor belt, in its most common shape, is made by means of a pair of chains of equal length with the ends coupled together and closed in a ring-shape. At a predefined pitch the push rods are fixed to the pins protruding from the link of the chain.

In an example of embodiment of the prior art, at the end of the push rods 10, made in this case from square section rods, a transverse and horizontal through hole 11 is provided in which a bush 12 is inserted having two through holes 13. The push rod 10 is placed in the centre of a pair of pins 14 protruding from the link of the chain 15. The pins 14 are inserted inside the holes 13 of the bush 12. The same operation is carried out on the other side of the push rod 10.

Said operation must be carried out in a position of the chain in which it is labile, i.e. the distance between the two chains can be widened in order to insert the pins 14 into the holes 13.

Furthermore, to facilitate the movement of the objects, some through holes are arranged on the push rods 10 where porters 16 are arranged, held by a screw 17.

Although the fixing of the push rods can be carried out in a different way to that described above, the following occurs.

The fixing of the push rods to the chain is carried out by means of mechanical parts, normally two for each push rod, which are obtained by milling and/or turning, in addition to the aid of small parts for assembly.

The support and guide structure of the chains, binds and contains the push rods at the ends, making assembly and disassembly operation somewhat complicated and often not very easy, in particular because the operation is possible only in given conditions/positions along the belt.

SUMMARY

The object of the present invention is to provide a system for fixing the push rods to the chain which is simple to manufacture.

Another object is to provide a system for fixing the push rods to the chain, which is simple to assemble or disassemble.

According to the present invention, these objects and others are achieved by a handling system for discrete articles provided with a system for fixing push rods to the chain comprising: two opposite sides which support a conveyor plane; two chain holder guides, opposite and fixed to said sides; two chains with links with protruding pins sliding inside said two chain holder guides; push rods fixable in a removable way, transversely to said conveyor plane, to said pins of said chain; characterized by comprising: blocks having a central hole suitable for sliding with friction on said push rods; said blocks having a pair of holes, lateral to said central hole, suitable for sliding with friction on said pins.

Further characteristics of the invention are described in the dependent claims. The advantages of this solution compared to solutions of the known art are various.

There is the possibility of optimizing the production of the blocks, at this point standard for each type of application, with a significant rationalization of the machining costs.

In fact, said blocks could be produced by means of 3D printers or by means of traditional plastic and/or metal moulding.

The mechanical processes to be carried out on the push rods to ensure coupling with the blocks are eliminated, with consequent further rationalization of production costs.

There is a significant reduction in assembly times and costs of the fixing group formed by the block and by the push rod.

There is also a significant reduction in assembly and disassembly times and costs of the fixing group intended for the first assembly (said operations are obviously necessary at the manufacturer during construction and testing) and/or machine set-up as different containers could request dedicated push rods to be replaced every time according to a given quantity, and/or maintenance/cleaning, where currently said operations could be carried out with a given regularity.

Greater flexibility and reconfigurability of the conveyor belt in terms of changing the pitch between two push rods along its entire length, as well as replacing one push rod with another for shape/need is also achieved.

BRIEF DESCRIPTION OF DRAWINGS

The characteristics and advantages of the present invention will become clear from the following detailed description of a practical embodiment thereof, illustrated by way of non-limiting example in the accompanying drawings, wherein.

DETAILED DESCRIPTION

Figure 1:
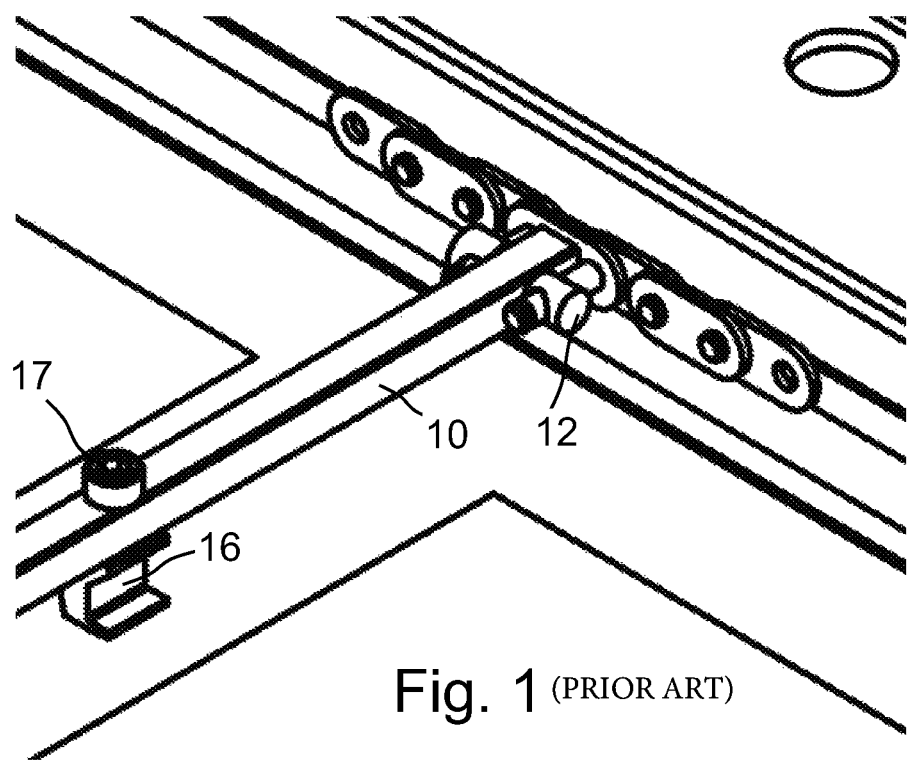
FIG. 1 shows a system for fixing push rods to the chain, which is assembled, according to the prior art.
Figure 2:
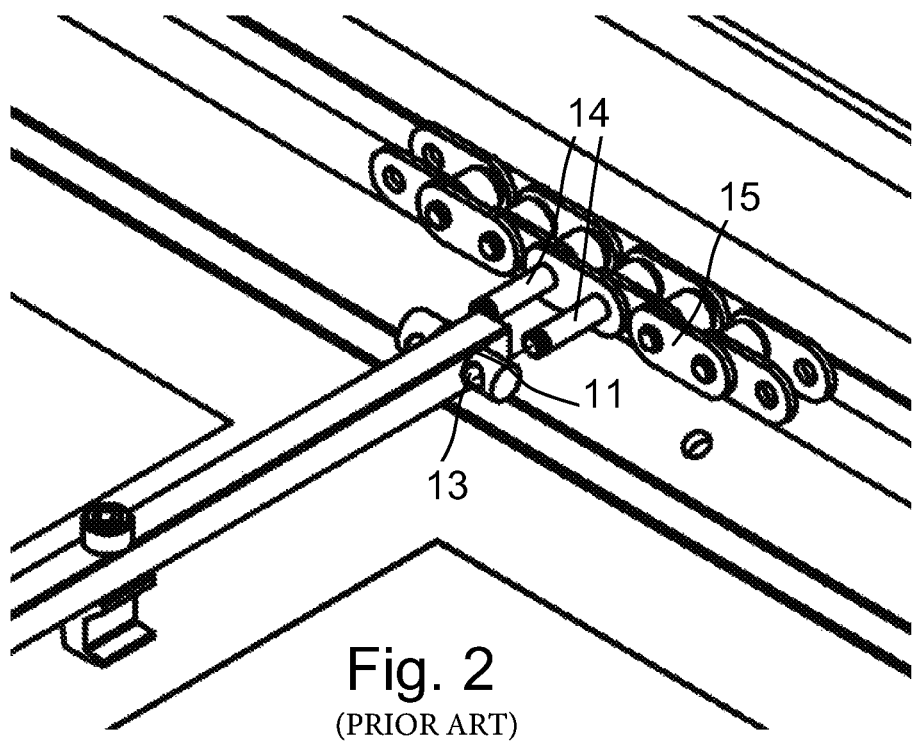
FIG. 2 shows a partially disassembled system for fixing push rods to the chain, according to the prior art.
Figure 3:
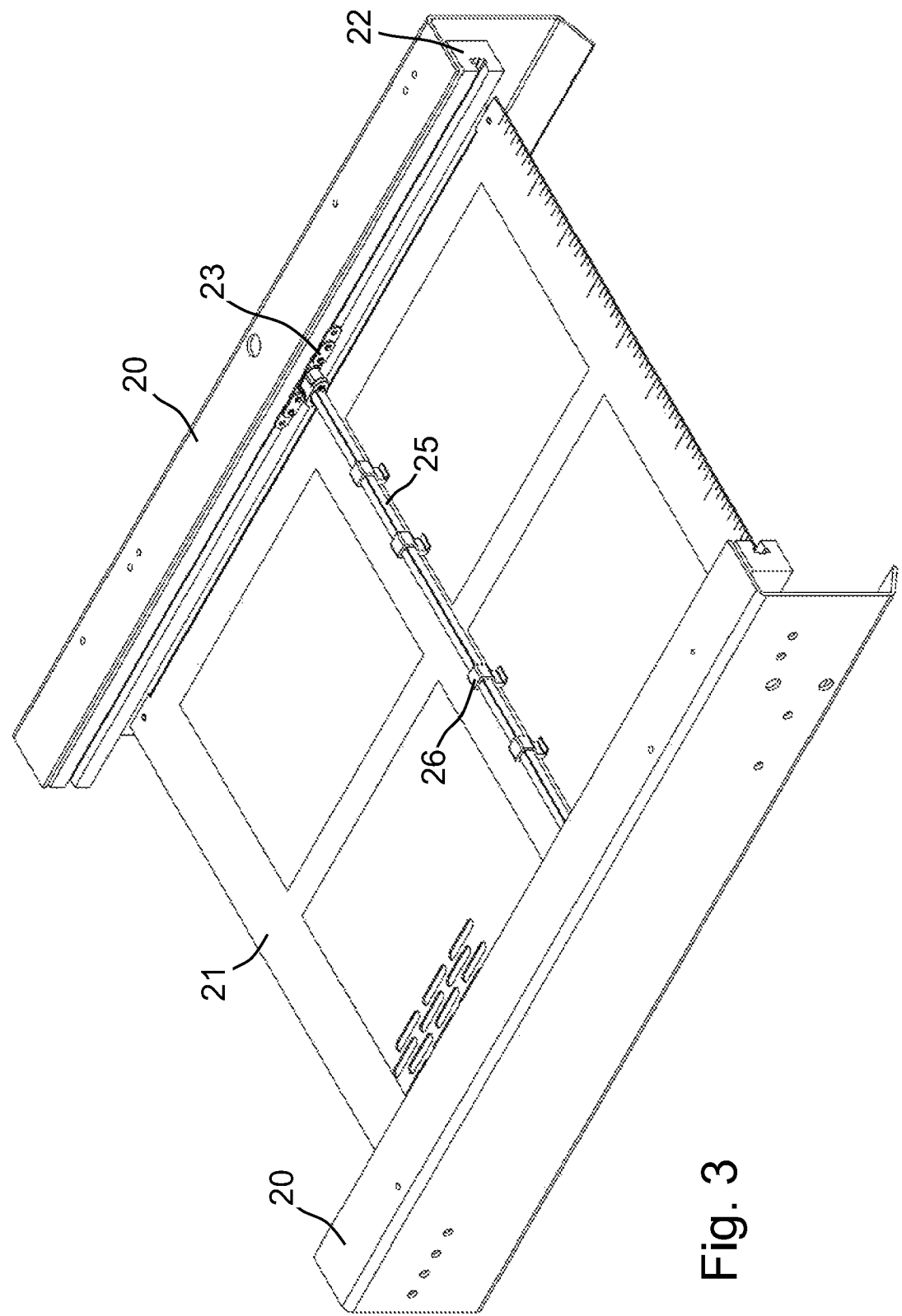
FIG. 3 shows a handling system for discrete articles comprising a system for fixing push rods to the chain, which is assembled, according to the present invention.
Figure 4:
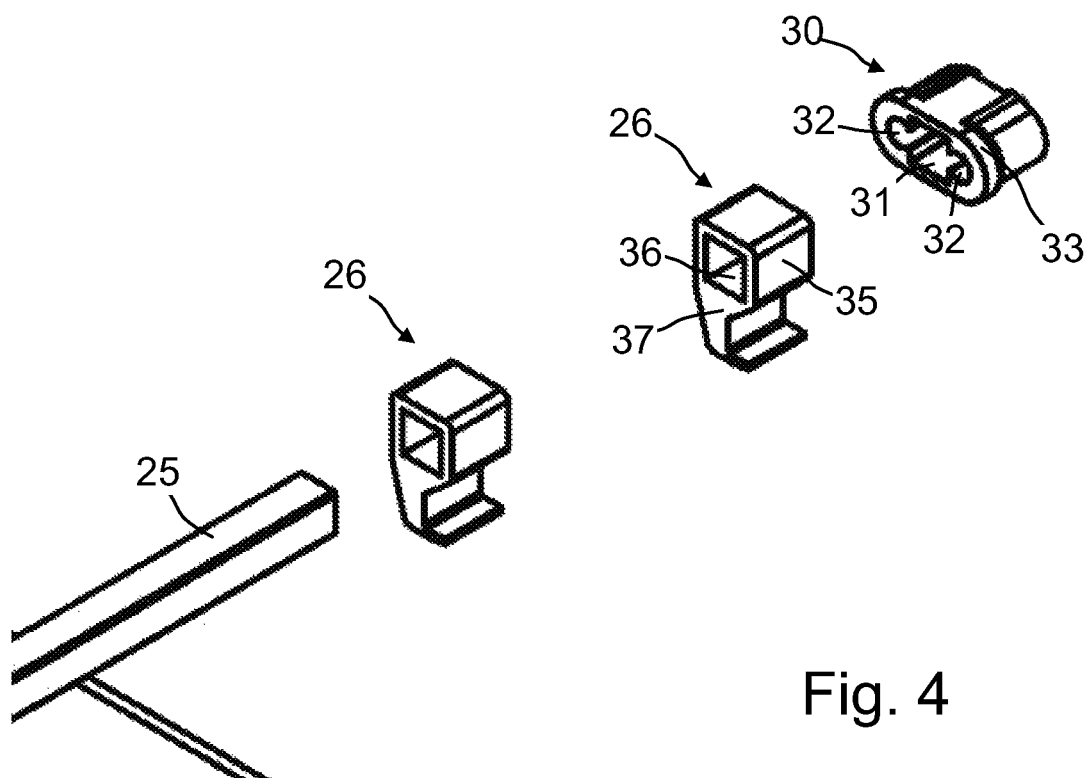
FIG. 4 shows a system of fixing push rods to the chain, in an exploded configuration, according to the present invention.
Figure 4:
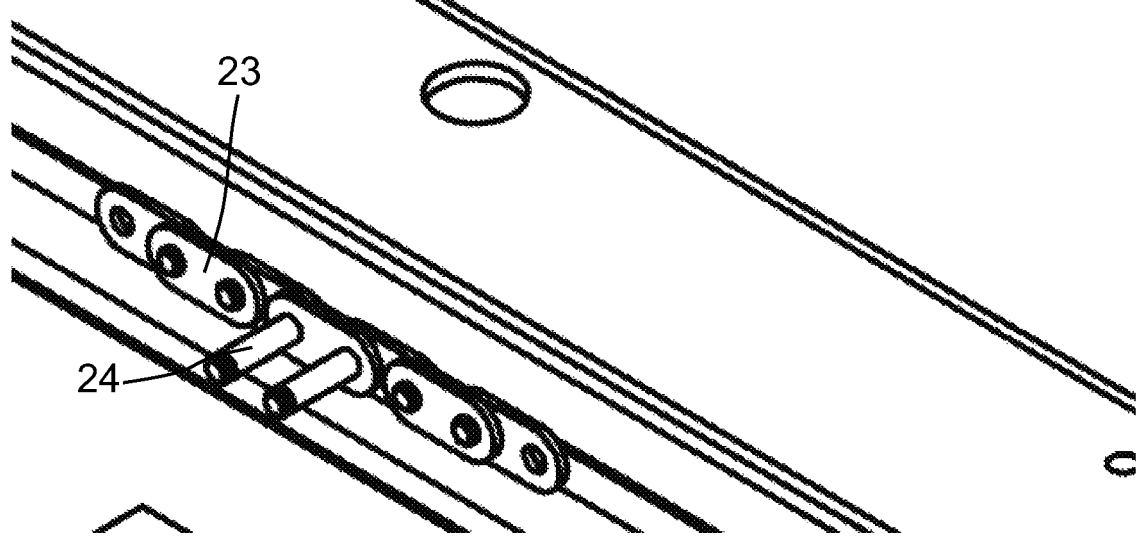
Figure 5:
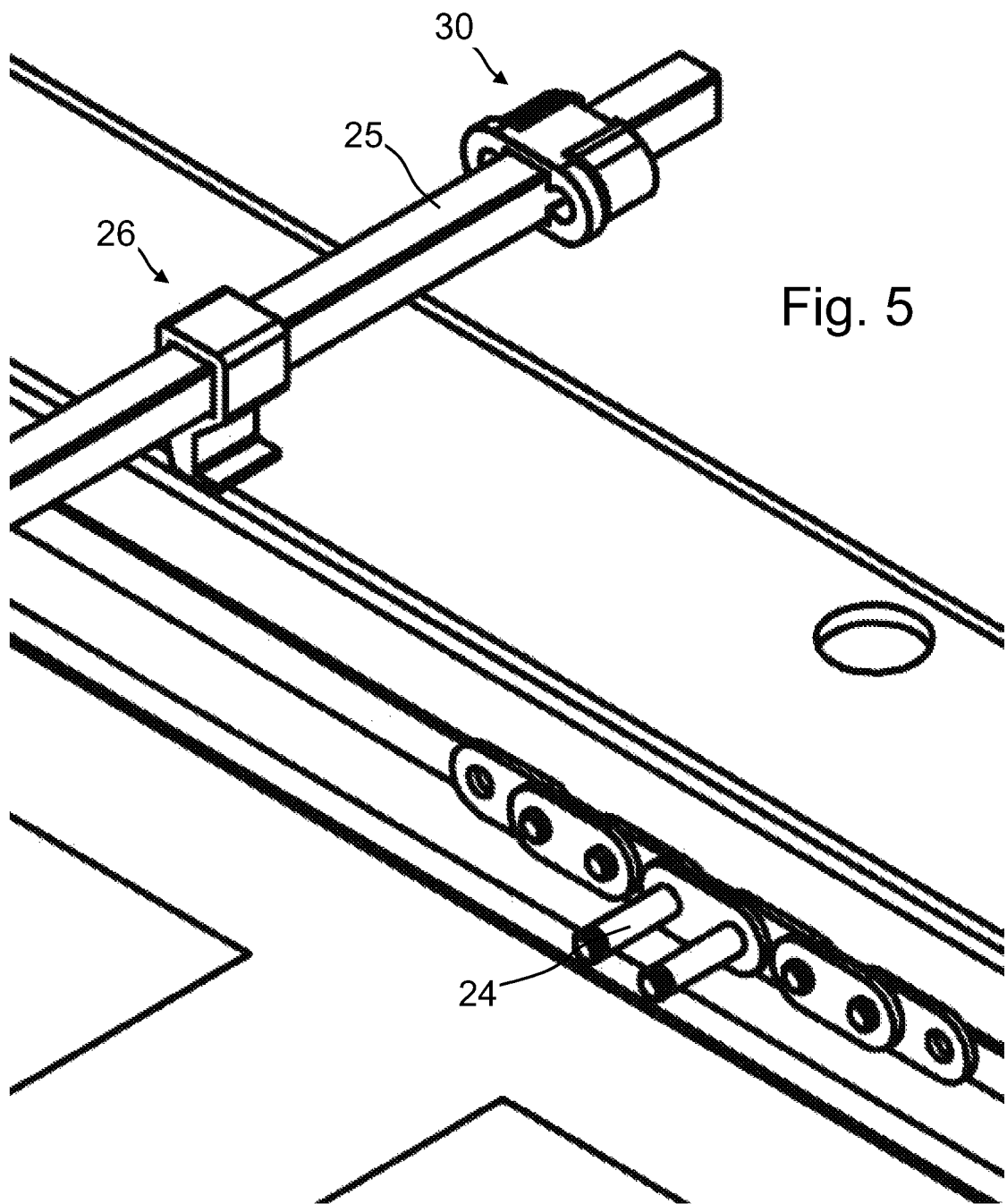
FIG. 5 shows a system of fixing push rods to the chain, partially assembled, according to the present invention.
Figure 6:
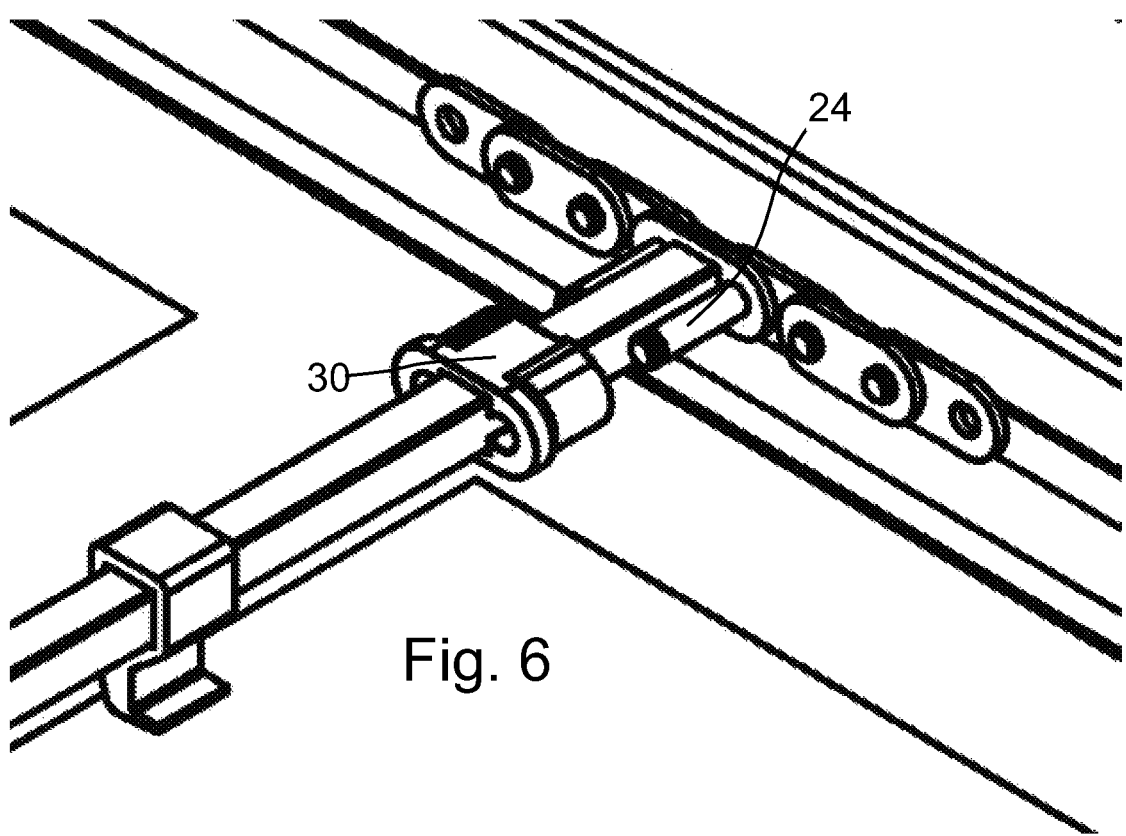
FIG. 6 shows a system of fixing push rods to the chain, partially assembled and placed in its seat, according to the present invention.
Figure 7:
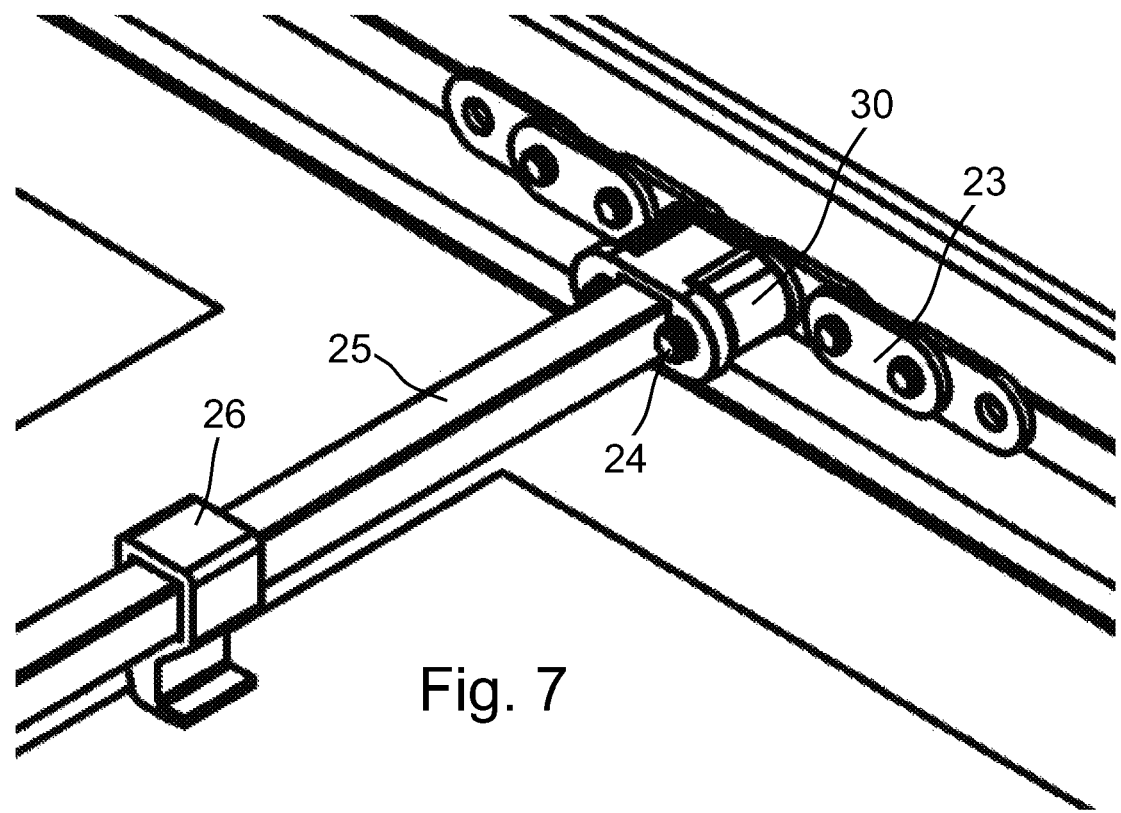
FIG. 7 shows a system for fixing push rods to the chain, which is assembled, according to the present invention.

Referring to the attached Figures, a handling system for discrete articles comprising a system for fixing push rods to the chain, according to the present invention, comprises two opposite sides 20 which support a conveyor plane 21 and two chain holder guides 22, also being opposite and fixed to the sides 20, which allow the movement of a chain 23 with links with protruding pins, on one side thereof.

The chain 23 at given distances or at each link has pairs of pins 24 protruding from the chain itself.

The system comprises, furthermore, push rods 25, made of square section rods, which are fixed, transversely to the conveyor plane 21, on both sides to the chain 23 by means of the pins 24.

On the push rods 25 some porters 26 are placed, which help the push rods 25 to move the articles.

The push rods 25 are fixed to the chain 23 by means of suitably shaped blocks 30.

The blocks 30 have an external parallelepiped shape, possibly with rounded edges, or having a section similar to that of the single element of the chain.

The blocks 30 have a central hole 31 having the shape of the section of the push rods 25, and in the case shown, a square shape. They also have a pair of holes 32, lateral to the central hole 31, having the shape of the section of the pins 24 of the chain 23, which, in this case, are circular.

The dimensions of the holes 31 and 32 and the positioning thereof inside the block 30, is given by the diameter and distance of the pins 24, as well as by the dimension of the section of the push rod 25.

In particular, in the case shown, given the typical dimensions of the elements involved, there are not three distinct holes but a single hole having a shape given by two circumferences joined together by a square.

Preferably, the blocks 30 have, externally, an edge 33, arranged externally with respect to the chain, to facilitate the grip of the block 30 during assembly and in particular during disassembly.

The porters 26 have a main portion 35 comprising a hole 36, having the shape of the section of the push rods 25, therefore it extends at the bottom with a thrust portion 37 of the most appropriate shape to fulfil its purpose.

To fix the push rods 25 to the chain 23, one or more porters 26 are inserted on the push rod 25, by inserting the push rod 25 into the hole 36 and by positioning the same along the length of the push rods 25 where desired The block 30 is then inserted into the central hole 31 on the push rods 25, one on each side, and is pushed until the ends of the pusher 25 are free.

The ends of the push rods 25 are arranged between the pairs of pins 24 protruding from the chain 23, in the desired position.

The blocks 30 are pushed towards the chain 23 until the pins 24 are inserted into the pair of holes 32, which are lateral to the central hole 31, until the block 30 comes into contact with the chain 23.

At this point the push rod complete with fittings (porters) is mounted without any tools or screws.

Disassembly is achieved by working in reverse of the assembly, by moving the blocks 30, grasping the same by the edges 33 if present, and by pushing them towards the inside of the push rod 25, thus releasing it.

The blocks 30 and the porters 26 can be made, once the geometries of the pins 24, of the chain 23 and of the push rods 25 have been defined, by establishing appropriate tolerances that create the sliding friction necessary so that they do not slip off along the push rod as a result of the chain vibrations.

Furthermore, the block 30 is not constructively subject to any traction or compression force such that further fixing is required.

The geometry of the blocks 30 allows the sliding thereof along the push rods 25 and the pins 24 of the chain 23 up to the point where their mechanical coupling no longer exists, a condition whereby it is possible to remove/replace the push rods 25 itself, at the same time the block 30 ensures the anchoring of the push rods 25 to the pins 24 of the chain 23.

Based on the same logic, the push rods can be customized, based on the type of container that must be handled, by applying suitably shaped and positioned/fixed porters without the need for additional small metal parts; said operation is even easier and recommended thanks to the ease of quick hooking/un-hooking of the push rods from the chain, by simply removing the blocks without any tools.

The materials used for the blocks and porters, as well as the dimensions, can be any according to the requirements and the state of the art.

The system thus conceived is therefore susceptible of numerous modifications and alternatives, all of which are within the scope of the inventive concept; moreover, all the parts detailed can be replaced by technically equivalent elements.

What is claimed is:

1. A system for moving discrete articles, comprising:
a chain having links, at least one link having at least one protruding pin, the chain positioned for movement alongside a path for the discrete articles;
a connector;
a push rod connected in a removable manner to the chain by the connector, wherein the connector is releasably connected to the push rod and releasably connected to the protruding pin;
wherein the connector includes an opening into which a portion of the push rod is positioned.

2. The system according to claim 1, wherein the connector frictionally engages at least one of the push rod or the protruding pin.

3. The system according to claim 2, wherein the connector frictionally engages both the push rod and the protruding pin.

4. The system according to claim 1, wherein connector includes an opening into which the protruding pin extends.

5. The system according to claim 1, wherein the connector includes a first opening into which a portion of the push rod is positioned and a second opening into which a portion of the protruding pin is positioned.

6. A system for moving discrete articles, comprising:
a chain having links, the chain positioned for movement alongside a path for the discrete articles;
a connector;
a push rod connected in a removable manner to the chain by the connector, wherein the connector is releasably connected to the push rod and the connector is pinned to the chain;
wherein the connector includes an opening into which a portion of the push rod is releasably positioned.

7. The system according to claim 6, wherein the connector frictionally engages the push rod.

8. The system according to claim 6, wherein a connection of the connector onto the push rod is configured such that the push rod can slide away from and release from the connector.

9. A system for moving discrete articles, comprising:
- a chain having links, the chain positioned for movement alongside a path for the discrete articles;
- a connector;
- a push rod connected in a removable manner to the chain by the connector, wherein the connector is releasably connected to the push rod and the connector is pinned to the chain;

wherein the connector is configured to engage against external surface regions of bottom and side portions of the push rod.

* * * * *